United States Patent [19]
Holl

[11] 4,071,225
[45] Jan. 31, 1978

[54] APPARATUS AND PROCESSES FOR THE TREATMENT OF MATERIALS BY ULTRASONIC LONGITUDINAL PRESSURE OSCILLATIONS

[75] Inventor: Richard A. Holl, St. Catharines, Canada

[73] Assignee: Holl Research Corporation, Mission Piejo, Calif.

[21] Appl. No.: 664,008

[22] Filed: Mar. 4, 1976

[51] Int. Cl.$^2$ .......................................... B01F 13/00
[52] U.S. Cl. ................................... 366/114; 366/127
[58] Field of Search ................ 259/48, 1 R, DIG. 15, 259/DIG. 41, DIG. 44; 181/142

[56] References Cited
U.S. PATENT DOCUMENTS

| | | | |
|---|---|---|---|
| 2,558,037 | 6/1961 | Calhoun | 259/1 R X |
| 2,717,768 | 9/1955 | Carpentier | 259/1 R |
| 3,165,799 | 1/1965 | Balamuth | 259/1 R |
| 3,946,829 | 3/1976 | Mori | 181/142 |

Primary Examiner—Edward J. McCarthy
Attorney, Agent, or Firm—Hirons & Rogers

[57] ABSTRACT

Apparatus for the treatment of materials by the application thereto of ultrasonic longitudinal pressure oscillations, for example, for dispersing or emulsifying or dissolving or mixing or deagglomerating consists of an enclosure having an interior with two closely-spaced walls at least one of which is made to oscillate at ultrasonic frequencies, or otherwise impart such oscillations to the interior, for example, by ultrasonic transducers mounted on the wall exterior. The spacing between the walls is such that the longitudinal pressure oscillations produced at the oscillating wall are reflected by the other wall, preferably several times, before they are attenuated to a negligible value. Preferably, the other wall also vibrates to produce doppler effects and avoid standing waves. The distance between the inner surfaces of the two walls is normally not more than about 1 inch (2.5 cm). The material to be treated preferably is fed to the enclosure interior under pressure from a storage container and is recirculated until the operation is complete. The invention also comprises processes for the treatment of materials using such oscillations.

24 Claims, 4 Drawing Figures

APPARATUS AND PROCESSES FOR THE TREATMENT OF MATERIALS BY ULTRASONIC LONGITUDINAL PRESSURE OSCILLATIONS

FIELD OF THE INVENTION

The present invention is concerned with improvements in or relating to apparatus and processes for the treatment of materials by the application thereto of ultrasonic longitudinal pressure oscillations for, for example, dispersing or emulsifying, or dissolving or mixing or deagglomerating materials.

REVIEW OF THE PRIOR ART

The dispersing, or emulsifying, or dissolving or mixing of various materials is of great importance in many industries. Dispersions, emulsions, solutions and mixtures are usually produced by rapid stirring, applying high shear rates, of divided solid material into a liquid. The conventional apparatus employed for stirring processes is usually simple in basic concept, generally consisting of a container and some mechanical stirring means extending into the contained mixture, but the processes to achieve satisfactory stirring are relatively lengthy and energy intensive, often involving several days of continuous operation. Accordingly a number of prior proposals have been made to attempt to improve both apparatus and processes.

For example, U.S. Pat. No. 2,558,037 discloses a mixing process especially for viscose production wherein the material is agitated in a closed tank by rotating blades and, upon discharge from the tank, passes through a pipe in which the mixture is subjected to high frequency sound waves of about 1 to 1000 kiloherz. These waves are produced by a generator and transmitted to the pipe interior by a transmission tube inside the pipe or connected thereto.

U.S. Pat. No. 2,673,811 teaches improving the quality of cupro-ammonium rayon spinning solution by applying supersonic waves thereto. To this end the vibrator is installed inside a box surrounding the solution-containing vessel opposite to a panel of material (such as polystyrene) in the bottom of the vessel. A transfer liquid connects the vibrator and the panel. The frequencies contemplated are about 10–100 kiloherz, with the input to the vibrator of about 5–20 watts per square cm of the operative vibrator surface.

U.S. Pat. No. 2,717,768 discloses apparatus for the extraction of fatty substances from vegetable oil-yielding cells wherein the cellular material is ground, partially fermented and then subjected to the action of supersonic waves to break the cell walls. The frequency employed is $10^4$ to $10^6$ hertz with optimum $10^5$ to $3 \times 10^6$ hertz. The supersonic apparatus is to consist essentially of a small section tube or bundle of such tubes having generators along their length, or may consist of a flat tube or bundle of tubes which contain quartz generators in the vicinity of their plane of symmetry. The dimensions of such a tube are by way of indication length ten meters and diameter 30 centimeters.

U.S. Pat. No. 2,765,153 discloses a process and apparatus for handling plastic masses such as ceramic masses and provides a conduit into which the mass is fed by a screw conveyor. A part of the conduit wall is arranged for applying pressure vibrations to the mass passing therein, for example by moving a part of the wall, or by a sonic vibrator, an imbalance vibrator, a magnetomotive or a crystal vibrator. The frequency is to depend upon the physical characteristics of the material to be treated.

U.S. Pat. No. 2,896,922 discloses ultrasonic means for either mixing or separating solid particles respectively with or from a liquid by forming standing waves of ultrasonic frequency in the containing tank and then effecting movement of the mixture in predetermined directions related to the nodes and anti-nodes of the waves.

In U.S. Pat. No. 3,233,872 there is disclosed an acoustic processing method and means in which a mixture to be dispersed or otherwise processed is subjected to the output of an acoustic vibration generator superimposed upon a hydrostatic pressure field, the latter being arranged to cause cavitation. Specifically, the pressurized fluid is passed through a venturi device, the reduced pressure at the venturi throat causing the cavitation.

U.S. Pat. No. 3,544,076 discloses a batch apparatus for the preparation of pasty mixtures, the apparatus comprising a container of conical shape with an emitter for supersonic oscillations constituting the chamber bottom. The contained mixture is subjected to the ultrasonic oscillations while an over-pressure is applied to the contents, giving intensive comminution with reduction of the solid to particles of size 0.2 to 1 micron. No values are given for the frequency or the overpressure.

It will be apparent therefore that a number of proposals have been made hitherto involving the application of pressure and ultrasonic vibrations to dispersions, but to my knowledge none of these processes appears to have met with commercial acceptance.

DEFINITION OF THE INVENTION

It is an object of the present invention to provide new apparatus and processes for the treatment of material by the application thereto of ultrasonic longitudinal pressure oscillations for, for example, dispersing or emulsifying or dissolving or mixing or deagglomerating the materials.

In accordance with the present invention there is provided apparatus for the treatment of materials by the application thereto of ultrasonic longitudinal pressure oscillations comprising:

an enclosure having an inlet thereto and an outlet therefrom for material to be treated therein, the enclosure having two opposite closely-spaced walls, at least one of which is an oscillation-applying wall, the spacing between the inner surfaces of the said spaced walls being between about 0.1 mm. and 25 mm.;

at least one ultrasonic generator mounted on the said oscillating-applying wall to apply longitudinal pressure oscillations to material contained within the enclosure interior; and means for feeding material through the enclosure interior from said inlet to said outlet.

Also in accordance with the invention there is provided apparatus for the treatment of material by the application thereto of ultrasonic longitudinal pressure oscillations comprising:

an enclosure having an inlet thereto and an outlet therefrom for material to be treated therein, and having two opposite closely-spaced walls at least one of which is an oscillation-applying wall;

the spacing between the walls being such that longitudinal pressure oscillations applied by the wall to the enclosure interior are reflected from the opposite wall and return to the oscillating-applying wall before the amplitude thereof is reduced to less than 10% of the original value;

at least one ultrasonic transducer mounted on the said oscillating-applying wall to apply longitudinal pressure oscillations to the material contained within the enclosure interior; and means for feeding material through the enclosure interior from the said inlet to the said outlet.

Further in accordance with the invention there is provided a process for the treatment of flowable material by the application thereto of ultrasonic longitudinal pressure oscillations including:

feeding the material to be treated through an enclosure from an inlet thereto to an outlet therefrom between two spaced parallel surfaces of the enclosure, the spacing between the said surfaces being such that ultrasonic oscillations transmitted from one wall toward the other through material passing between them are reflected from the said other wall and return to the oscillation-applying wall before the amplitude thereof is attenuated to less than 10% of the original value, the oscillations thereby being reflected a plurality of times from the surfaces and passing a corresponding plurality of times through the material with added amplitudes at moving spaced locations within the material; and vibrating at least one of the surfaces with ultrasonic longitudinal pressure oscillations to apply the said oscillations to the material passing between the surfaces.

The said apparatus in accordance with the invention may also include:

a storage container for the material to be treated;

a pump for feeding material under pressure from the storage container interior to the enclosure interior and for generating pressure in the material in the enclosure interior; and pipes connecting the pump and the interiors of the storage container and the enclosure and for circulation of the material between the said interiors.

Preferably the other said wall of the two closely-spaced walls is easily vibratable at the ultrasonic frequencies and/or has at least one ultrasonic transducer mounted thereon to apply longitudinal pressure oscillations through the wall, thereby producing doppler effects in the oscillations applied to the material and avoiding the formation of standing waves.

DESCRIPTION OF THE DRAWINGS

Apparatus which are particular preferred embodiments of the invention will now be described, by way of example, with reference to the accompanying diagrammatic drawings, wherein.

DESCRIPTION OF THE PREFERRED EMBODIMENTS

The invention is concerned with the treatment of material by the application thereto of longitudinal pressure oscillations or waves of supersonic frequency, which oscillation waves are normally regarded as those in the range above about 10-15 KHz. It is essential that oscillations or waves of such frequency be used in the treatment, but this does not preclude that in some treatments oscillations or waves of lower than ultrasonic, e.g. in the range 5-15 KHz may also be used.

Figure 1:
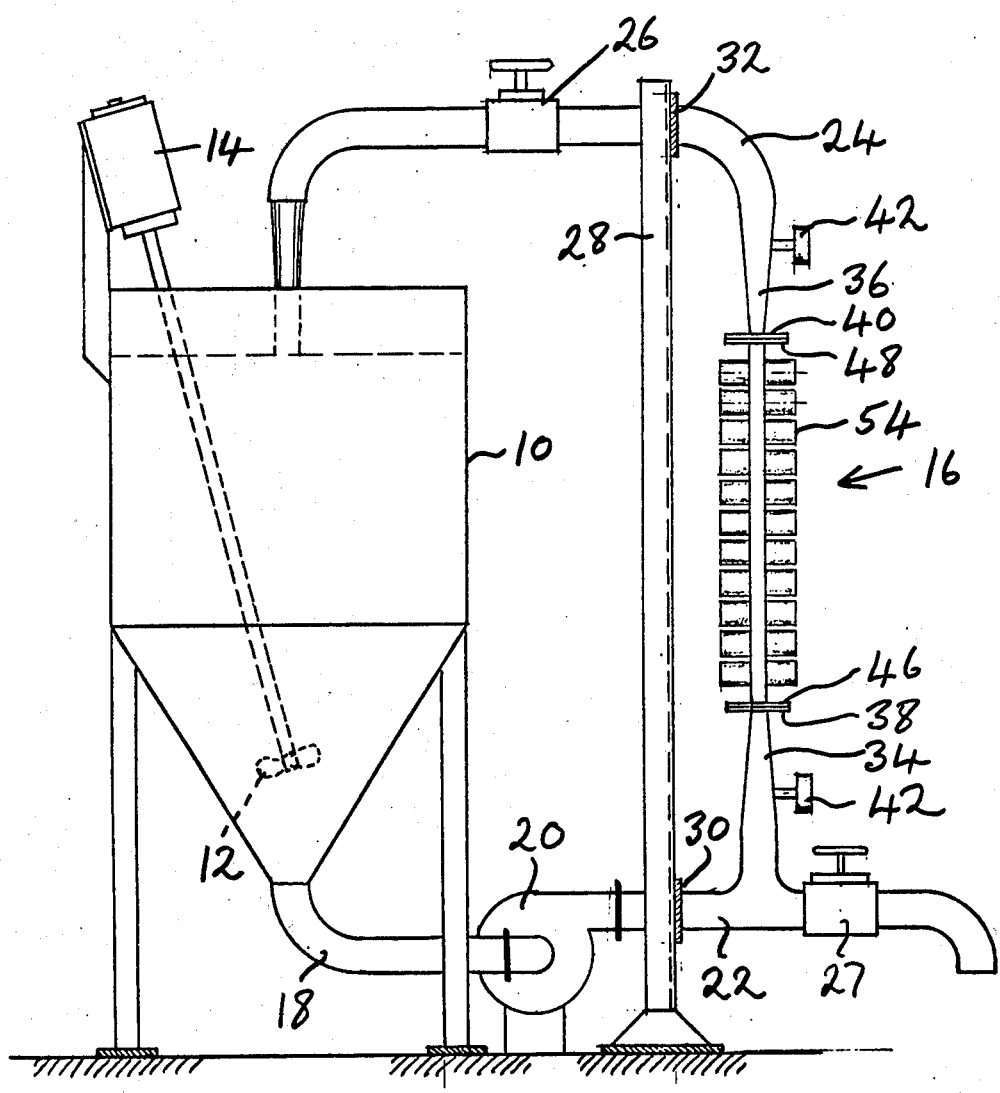
FIG. 1 is a side elevation of a complete system including storage container, enclosure, pump and connecting pipes.
Figure 2:
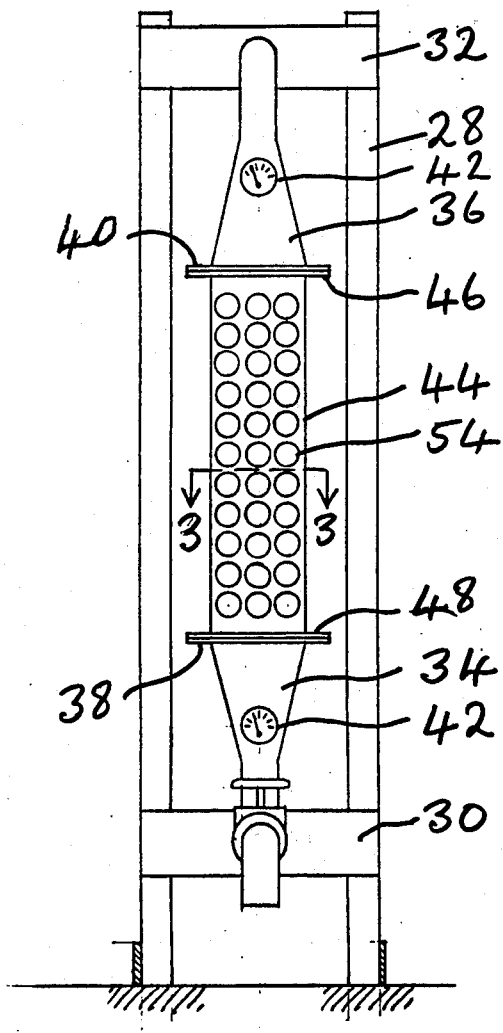
FIG. 2 is a front elevation of the enclosure alone of the system of FIG. 1.

Referring now to FIG. 1 it will be assumed for ease in description that the apparatus is to be used for the dispersion of finely-divided solid material in a liquid; ideally each solid particle will be individually separately suspended in the liquid. The apparatus includes a storage container 10 into which the liquid vehicle and the finely-divided solid material are loaded. The container interior is provided with a conventional mixing paddle 12 driven by a motor 14, this paddle being operated at least during the initial stages of a dispersing operation to provide a coarse dispersion, and to ensure that the liquid contains no large lumps that might jam in the enclosure, which is indicated generally by the reference 16.

A pipe 18 feeds the liquid with the suspended solid material to a pressure pump 20, and a pipe 22 feeds the pressurized liquid mixture to the cell interior. Another pipe 24 feeds the liquid that exits from the cell through a valve 26 and thence back to the container interior, so that the container contents can be recirculated until the dispersion has proceeded to the required extent. An outlet valve 27 is also provided.

The cell 16 consists of a metal frame 28 having respective cross pieces 30 and 32 in which the pipes 22 and 24 respectively are mounted to hold the cell body in the frame. Each pipe 22 and 24 is of circular cross-section and terminates at its end connected to the enclosure 16 in a respective transition portion 34 and 36, by which the circular pipe bore is smoothly and progressively changed to a thin highly-elongated rectangle, each portion terminating in a respective horizontal flange 38 and 40. Pressure gauges 42 are provided to monitor the pressure within the transition members and thus at the inlet and outlet of the enclosure interior.

Figure 3:
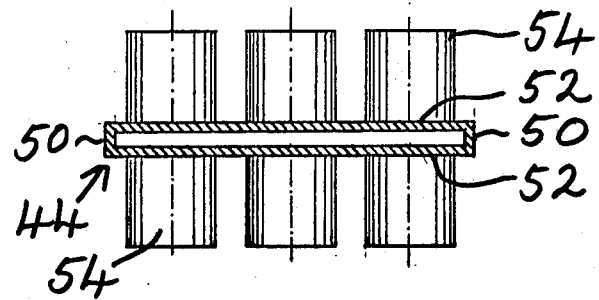
FIG. 3 is a plane section taken on the line 3—3 of FIG. 2.

Referring now also to FIG. 3, the enclosure body consists of a rectangular cross-section member 44 having end flanges 46 and 48, which register respectively with the flanges 38 and 40, and are bolted thereto by readily removable bolts which are not shown. The member 44 provides two short widely-spaced parallel walls 50 and wide, closely-spaced parallel oscillation-applying walls 52. In this embodiment the walls 50 and 52 are shown as integral with one another, but in other embodiments the walls 50 may be provided by an open-faced frame member 44, while the oscillation-applying walls 52 are constituted by respective relatively thin sheet metal membranes bolted at their edges to respective flanges of the frame member 44, a suitable sealing gasket being of course employed.

Each of the closely-spaced oscillation-applying walls 52 has mounted thereon a large plurality of ultrasonic transducers, such as 54, the transducers directing their generated longitudinal pressure waves into the pressurized liquid in the enclosure interior perpendicularly to the plane of the walls 52 and also to the direction of flow of the liquid in the enclosure. The transducers are connected to a suitable source of power which is not illustrated.

As a specific example of the successful operation of apparatus in accordance with the invention, such apparatus intended for the production of clay slip is found to produce a superior slip in only 2 hours, as compared to the 24-36 hours required by conventional dispersing processes. Moreover, the slip thus produced when used for porcelain production is found to result in unfired blanks of superior green strength. The resulting blanks are found to have a green strength of more than 50% greater than with conventional processes and to have a consistency almost of rubber and can be flexed without breakage. Another highly surprising effect of the use of the invention is that the deposition of the slip to form a solid "bottom cake" in the container is considerably reduced and, for example, there is little or no deposition upon standing for as long as eight weeks, all of the slip being pourable after that period.

It is well known to those skilled in the art that the difficulty of obtaining satisfactory dispersion of finely divided solids in a liquid increases rapidly when the solids concentration reaches high levels, for example, over 50% by weight, which is a normal value for a clay slip. The problem becomes of course even greater at much higher solids contents, for example the 80% value that may be required in ceramic glazes.

It is believed that one reason for these unusual results is that the apparatus quickly and thoroughly disperses uniformly all of the surface-active additives, despite the enormous surface area of the finely-divided clay, which tends to retain the additives in localized areas. Mechanical stirring may eventually produce an equivalent condition, but at least several days would be required and this is simply not economical in commercial practice.

It is a surprising characteristic of the dispersing processes employed with the apparatus of the invention that they are self indicating as to when the dispersing process has been completed. Thus, if for example the apparatus is adjusted initially to give a pressure within the cell of about 60 p.s.i. (4.2 Kg/sq. cm.), as indicated by the outlet pressure gauge 42, then the pressure is found to decrease gradually until it reaches a minimum value, typically about 20 p.s.i. (1.4 Kg/sq. cm.) and then remains at that value. Analysis of the dispersion shows that the dispersing is completed when this stable lower pressure has been reached, the liquid now having attained its minimum possible viscosity.

Prior users of longitudinal ultrasonic vibrations for treatment purposes do not appear to have appreciated the very short range of action of even higher power transducers when the vibrations are intended to assist in dispersion or solution, and a practical maximum thickness for the interior of the mixing enclosure 16, measured between the interior surfaces of walls 52 thereof is only 1 inch (25 mm). The thickness preferably is even smaller and values as low as ¼ to 1/16 inch (6–1.5 mm) are to be preferred, the lower value being determined for example by the flow capacity required in the cell and the practical economics of obtaining this flow capacity with the minimum number of cells. Thus, in some systems it may be found desirable to use spacings of only 0.1 mm.

The upper value for the wall spacing will depend upon, among other parameters, the viscosity of the mixture under treatment, and preferably it is such that each incident wave is reflected from the opposite wall and returns to the oscillation-providing wall, so that it travels at least twice through the enclosure before it is attenuated to a negligible value, i.e., less than about 10% of its original value. Much lower values of attenuation, e.g. 50% and lower, are to be preferred as is discussed below. For reasons which will be discussed below in considering the transducers 54 the maximum number of reflections is desired for each incident wave train so that it travels as many times as possible through the enclosure interior.

It is found desirable to dispose the enclosure so that the liquid flow path has a substantial vertical component, the effect of gravity acting on the liquid against the movement produced by the pump ensuring that any voids or cavities that form in the liquid will move therewith and discharge from the enclosure, since otherwise such voids or cavities would seriously affect the efficiency of the transducers. If the enclosure can be disposed with the flow path completely vertical as illustrated then this is preferred.

The closely-spaced walls 52 should be made as thin as possible for efficient transmission of the longitudinal vibrations. It is practical in a commercial apparatus to make the thin closely-spaced walls easily replacable, since the circulating liquid may be highly abrasive and therefore wear inducing. In the particular apparatus these walls are of 0.07 inch thickness (1.8 mm), providing adequate support for the generators and withstanding the liquid pressure within the cell. It will be understood that thinner walls could be employed if steps are taken to support them against the internal pressure.

The use of a large number of closely-spaced transducers 54 is preferred, since this arrangement creates an intense flat ultrasonic wave field. The preferred arrangement is to provide transducers on each of the two opposite walls so that both walls are simultaneously generating and reflecting waves. Since all the reflected waves come from a vibrating surface they travel with periodically changing frequencies created by Doppler effects, so that there is no possibility of creating standing waves, which have an adverse agglomerating effect on small particles.

The above-described multiple reflections added to the simultaneous vibration of both walls ensures that at an enormous number of densely spaced points throughout the enclosure interior the amplitudes of the generated waves are added, sometimes many times over.

The energy per unit volume (E) present in a longitudinal pressure wave is given by the equation:

$$E = 2\pi^2 f^2 A^2 d$$

where
$f$ = frequency of the wave
$A$ = amplitude, and
$d$ = density of medium in which wave is travelling.

It will be seen therefore that addition of the amplitudes of the wave crests resulting from multiple reflections produces a corresponding square function increase in energy at the point of coincidence of the wave crests. It will also be seen that an increase in frequency is also accompanied by a corresponding square function increase in energy content, besides increasing correspondingly the probability of the number of coincident points at which wave crests are added together. Owing to the described desirable doppler effect there is the further high probability of an enormous number of points at which both frequency and peak amplitude effects are added simultaneously, with corresponding added effects on the energy content at these points.

If it is possible, it is desired that the maximum spacing be such that attenuation upon the first reflection is only to about 90% of the original amplitude, so that the added amplitudes are of comparable magnitudes, and this involves not less than about 4 or 5 reflections before complete attenuation. Even higher figures of 10 and 20 reflections are preferred, if economically possible.

These points are constantly moving and the tremendous energies built up by the added peak amplitudes and frequencies are applied to and removed from the mixture at these points with an enormous number of sequences per second (e.g. 50–500 kiloherz). The result is the thorough dispersion of the fine particles in their liquid vehicle, the emulsification of any liquid droplets in their liquid vehicle, the rapid solution of one material in the other, and the thorough deagglomeration of an agglomerated material into component particles, all at a faster rate and with greater efficiency than is possible with conventional stirring apparatus.

For example, a conventional stirring disperser for a 1000 gallon container of clay slip would employ a stirrer motor of about 40 h.p. The apparatus of the invention to process an equivalent amount of slip requires 2.7 h.p. for the ultrasonic generators, 6.3 h.p. for the recirculating pump 20, and 3 h.p. for the de-lumping stirrer motor 14, for a total of only 12 h.p.

A further increase in dispersion, and deagglomerating effect can be obtained with the apparatus by increasing the pressure within the enclosure above atmospheric, in this apparatus by throttling with the valve 26. The improved effect can be noted for example with very fine submicron pigments such as Prussian Blue; an increase of only 0.5 p.s.i. in the pressure will result in a doubling of the number of particles of 0.3 micron size, compared to the number obtained with a treatment at atmospheric pressure.

When the apparatus is used in a dissolving process the intensely changing submicron size convections which are taking place in the liquid prevent the formation of highly concentrated and supersaturated diffusion layers around the dissolving solute particles, speeding up the mass transfer to the extent that the time taken by the dissolving process can be as little as 1/5 that of convention stirring apparatus, with the prevention of the formation of supersaturated solutions.

The frequency of the transducer generators can vary widely and preferably is from 15 KHz to 500KHz, although lower frequency waves of from 5 to 15 KHz may be used additionally, as described above. It is preferred to use a mixture of frequencies by arranging that at least one of the transducers on each wall is of different output frequency from the other transducers, thus assisting in avoiding standing waves. It will be understood that this procedure can be extended until every transducer on the same wall has a different output frequency.

Figure 4:
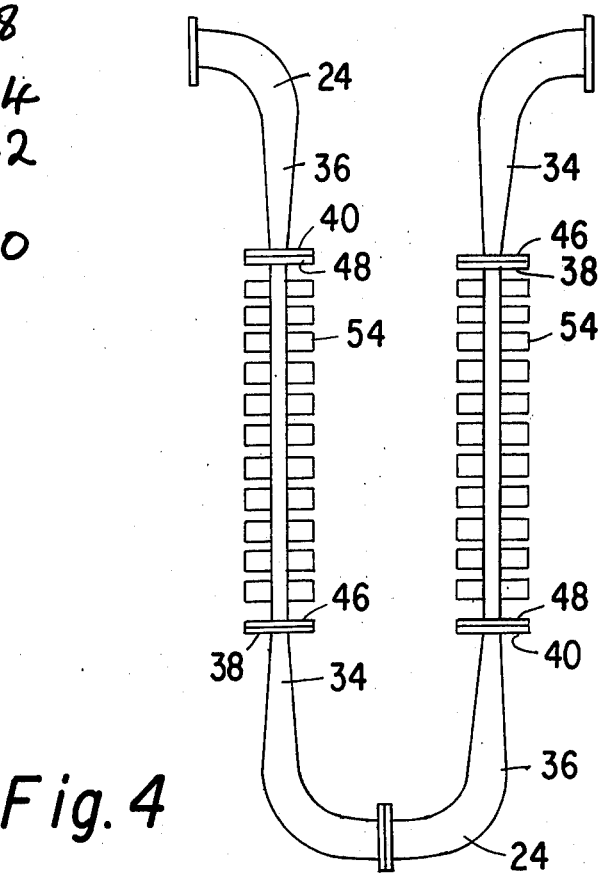
FIG. 4 is a side elevation to show the manner in which two enclosures are connected in series.

A further improvement in performance is possible by employing successively higher frequencies from transducer row to row in the direction of flow of the material, beginning with the lowest frequency, say 5 KHz with a row of transducers near to the entrance of the fluid into the enclosure from the pipe 22, the frequency then being increased progressively until the highest frequency is coming from the row of transducers near to the exit of the enclosure to the pipe 24, which frequency could be as high as 5 MHz. The lower frequency waves are more effective on larger particles and the higher ones on finer particles. As the process proceeds in the enclosure it is therefore advantageous to apply higher and higher frequencies as the particles become finer and finer. In a system particularly suitable for continuous operation two or more cells or enclosures may be employed with their interiors connected in series, as illustrated by FIG. 4z wherein each successive cell is equipped with transducers of different increasing frequency, e.g., the first cell could operate with transducers of 5 KHz, the second with transducers of 50 KHz, the third with 100 KHz, the fourth with 500 KHz, the fifth with 1 MHz, the sixth and final cell with 5 MHz.

As an example of the power consumption that is required, it may be mentioned that the described apparatus intended for the dispersion of 4,400 pounds (2,000 Kilos) of clay in 1000 gallons (3,790 liters) of water has a cell 16 of 41 inches (104 cm.) height, and 7 inches (18 cm.) width with a chamber of 1/2 inch (1.27 cm.) thickness and employs 48 transducers 54 of total input rating 2,000 watts.

The pressure at which the apparatus is operated is also of importance and pressures within the range from 10 to 120 p.s.i. (0.7 to 8.5 Kg/sq. cm.) are normally employed, with the preferred range being from 5 to 30 p.s.i. (0.35 to 2.1 Kg./sq.cm.).

It will be appreciated that the circulating liquid is subjected to the energy from the tranducers, the pump, and the mechanical stirrer, with the result that its temperature increases. If the temperature rise produced is unacceptable then some means must be employed to cool the liquid. Electrically actuated transducers are preferred because of their ease of application, but other forms of transducers may be employed. The jets and whistle generators used in some prior processes are not satisfactory since they require the material being treated to be passed through very small orifices under very high pressures, resulting in high wear of the orifices, high power consumption and frequent plugging of the orifices.

The apparatus of the invention may be employed to treat a mixture of gaseous fluids when it is desired to react such components together and the reaction is facilitated by the applied ultrasonic longitudinal waves. It is particularly suited for treating liquid/liquid mixtures and liquid/solid mixtures. It may also be employed to treat gas/liquid mixtures, and can be employed to treat gas/solid and solid/solid mixtures provided the solid is in flowable or fluidized form.

I claim:

1. Apparatus for the treatment of material by the application thereto of ultrasonic longitudinal pressure oscillations comprising:

an enclosure having an inlet thereto and an outlet therefrom for material to be treated therein, the enclosure having two opposite closely-spaced walls at least one of which is an oscillation-applying wall, the spacing between the inner surfaces of the said walls being between about 0.1 mm and 25 mm;

at least one ultrasonic transducer mounted on the said oscillating-applying wall to apply longitudinal pressure oscillations to material contained within the enclosure interior;

and means for feeding material through the enclosure interior from said inlet to said outlet.

2. Apparatus as claimed in claim 1, wherein both the said closely spaced walls are pressure oscillation-applying walls, and each wall has at least one ultrasonic transducer mounted thereon.

3. Apparatus as claimed in claim 1, wherein the said oscillation-applying wall has a plurality of uniformly spaced ultrasonic transducers mounted thereon.

4. Apparatus as claimed in claim 1, wherein each oscillation-applying wall has a plurality of transducers thereon spaced from each other from the inlet to the outlet with the frequency of the transducers increasing in the direction of flow of the material from the inlet to the outlet.

5. Apparatus as claimed in claim 1, wherein each oscillation-applying wall has a plurality of ultrasonic transducers mounted thereon, at least one of the transducers being adapted to produce a different frequency from the other transducers.

6. Apparatus as claimed in claim 1, wherein the means for feeding material through the enclosure interior include inlet and outlet pipes with bores of conventional circular cross-section and respective inlet and outlet pipe transition portions between the said pipes and the enclosure, the transition portion having bores progressively changing from said circular cross-section to elongated rectangular cross-section at the inlet and outlet respectively of the enclosure.

7. Apparatus as claimed in claim 2, wherein each of the said oscillation-applying walls has a plurality of uniformly-spaced ultrasonic transducers mounted thereon.

8. Apparatus as claimed in claim 1, and including a storage container for the material to be treated; a pump for feeding material under pressure from the storage container interior to the enclosure interior and for generating pressure in the material in the enclosure interior; and pipes connecting the pump and the interiors of the storage container and the enclosure for circulation of the material between the storage container and enclosure interiors.

9. Apparatus as claimed in claim 8, and including pipe means connecting the enclosure and storage container interiors to recirculate the material from the enclosure to the container.

10. Apparatus as claimed in claim 8, and including mechanical mixing means extending into the storage container interior for preliminary mixing of the contained material.

11. Apparatus as claimed in claim 1, and including a plurality of said enclosures having their interiors connected in series, the frequency of the transducers for each enclosure increasing from enclosure to enclosure in the direction of flow of the material.

12. Apparatus for the treatment of material by the application thereto of ultrasonic longitudinal pressure oscillations comprising:
an enclosure having an inlet thereto and an outlet therefrom for material to be treated therein, and having two opposite closely-spaced walls at least one of which is an oscillation-applying wall;
the spacing between the walls being such that longitudinal pressure oscillations applied by the wall to the enclosure interior are reflected from the opposite wall and return to the oscillating-applying wall before the amplitude thereof is reduced to less than 10% of the original value;
at least one ultrasonic transducer mounted on the said oscillating-applying wall to apply longitudinal pressure oscillations to the material contained within the enclosure interior;
and means for feeding material through the enclosure interior from the said inlet to the said outlet.

13. Apparatus as claimed in claim 12, wherein the spacing between the said walls in such that upon the first reflection from the opposite wall the amplitude of the oscillations is reduced to a value not less than 90% of the original amplitude.

14. Apparatus as claimed in claim 12 wherein each pressure oscillation-applying wall has a plurality of uniformly-spaced ultrasonic transducers mounted thereon.

15. Apparatus as claimed in claim 12 wherein each oscillation-applying wall has a plurality of transducers spaced from each other from the inlet to the outlet with the frequency of the transducers increasing progressively in the direction of flow of the material therein.

16. Apparatus as claimed in claim 14, wherein each oscillation-applying wall has a plurality of ultrasonic transducers mounted thereon, at least one of the transducers being adapted to produce a different frequency from the other transducers.

17. Apparatus as claimed in claim 12, and including a plurality of said enclosures having their interiors connected in series, the frequency of the transducers for each enclosure increasing from enclosure to enclosure in the direction of flow of the material.

18. Apparatus as claimed in claim 12, and including a storage container for the material to be treated; a pump for feeding material under pressure from the storage container interior to the enclosure interior and for generating pressure in the material in the enclosure interior; and pipes connecting the pump and the interiors of the storage container and the enclosure for circulation of the material between the storage container and enclosure interiors.

19. Apparatus as claimed in claim 18, and including pipe means connecting the enclosure and storage container interiors to recirculate the material from the enclosure to the container.

20. Apparatus as claimed in claim 18, and including mechanical mixing means extending into the storage container interior for preliminary mixing of the contained material.

21. Apparatus as claimed in claim 12 wherein the spacing between the walls is such that longitudinal pressure oscillations applied by the wall to the enclosure interior are reflected from the opposite wall and return to the oscillating-applying wall before the amplitude thereof is reduced to less than 50% of the original value.

22. A process for the treatment of flowable material by the application thereto of ultrasonic longitudinal pressure oscillations including:
feeding the material to be treated through an enclosure from an inlet thereto to an outlet therefrom between two spaced parallel surfaces of the enclosure, the spacing between the said surfaces being such that ultrasonic oscillations transmitted from one wall toward the other through material passing between them are reflected from the said other wall and return to the oscillation-applying wall before the amplitude thereof is attenuated to less than 10% of the original value, the oscillations thereby being reflected a plurality of times from the surfaces and passing a corresponding plurality of times through the material with added amplitudes at moving spaced locations within the material, and
vibrating at least one of the surfaces with ultrasonic longitudinal pressure oscillations to apply the said oscillations to the material passing between the surfaces.

23. A process as claimed in claim 22, wherein the spacing between the said spaced surfaces is from about 0.1 mm. to 25 mm.

24. A process as claimed in claim 22, wherein the material is fed between the surfaces in a direction having a vertically-upward extension.

* * * * *